United States Patent
Kawakami

(10) Patent No.: US 7,853,737 B2
(45) Date of Patent: Dec. 14, 2010

(54) DATA TRANSFER AND ALIGNMENT DEVICE AND METHOD FOR TRANSFERRING DATA ACQUIRED FROM MEMORY

(75) Inventor: Daisuke Kawakami, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 507 days.

(21) Appl. No.: 11/122,116

(22) Filed: May 5, 2005

(65) Prior Publication Data

US 2005/0262277 A1    Nov. 24, 2005

(30) Foreign Application Priority Data

May 20, 2004    (JP) .............................. 2004-150736

(51) Int. Cl.
 *G06F 3/00* (2006.01)
(52) U.S. Cl. .............................. 710/52; 710/65; 710/66; 710/307; 710/309; 710/310; 710/316; 711/201; 370/473; 370/474; 370/394
(58) Field of Classification Search .................. 710/52, 710/65, 66, 307, 309, 310, 316; 711/201; 370/473, 474, 394
See application file for complete search history.

(56) References Cited

U.S. PATENT DOCUMENTS

| | | | | |
|---|---|---|---|---|
| 4,866,702 | A * | 9/1989 | Shimizu et al. ............. 370/438 |
| 5,610,921 | A * | 3/1997 | Christensen ............. 370/395.4 |
| 5,956,524 | A * | 9/1999 | Gajjar et al. .................. 710/62 |
| 6,628,672 | B1 * | 9/2003 | Cabello ....................... 370/473 |
| 6,681,272 | B1 * | 1/2004 | Anderson et al. ............. 710/52 |
| 6,714,553 | B1 * | 3/2004 | Poole et al. .................. 370/412 |
| 6,717,910 | B1 * | 4/2004 | Kasper et al. ............... 370/229 |
| 6,779,084 | B2 * | 8/2004 | Wolrich et al. .............. 711/118 |
| 7,127,536 | B2 * | 10/2006 | Taylor et al. .................. 710/58 |
| 7,243,172 | B2 * | 7/2007 | Oner et al. ..................... 710/66 |
| 2003/0163618 | A1 * | 8/2003 | Anand et al. .................. 710/52 |
| 2004/0001484 | A1 * | 1/2004 | Ozguner ..................... 370/389 |
| 2004/0151175 | A1 * | 8/2004 | Moll et al. .................. 370/389 |
| 2006/0050738 | A1 * | 3/2006 | Carr et al. .................... 370/474 |
| 2006/0120405 | A1 * | 6/2006 | Engbersen .................. 370/473 |

FOREIGN PATENT DOCUMENTS

JP    61-118853    6/1986
JP    09-093214    4/1997

OTHER PUBLICATIONS

IBM Technical Disclosures NN9212375, NN921230, and NN9511359.*
Japanese Office Action dated Sep. 29, 2009 (with partial English translation).

* cited by examiner

*Primary Examiner*—Henry W Tsai
*Assistant Examiner*—Steven G Snyder
(74) *Attorney, Agent, or Firm*—McGinn IP Law Group, PLLC

(57) ABSTRACT

A communication data processing device according to an aspect of the invention includes a memory storing data, a data bus transmitting data read from the memory, a plurality of buffer memories temporarily storing data from the memory via the data bus and being capable of receiving and providing data independently of each other, a bus arbiter arbitrating use of the data bus to control data read from the memory to the plurality of buffer memories, an aligner aligning input data in a sequence corresponding to a packet communication, and a selector selecting a buffer memory from the plurality of buffer memories to output data from the selected buffer memory toward the aligner.

13 Claims, 4 Drawing Sheets

DATA TRANSFER AND ALIGNMENT DEVICE AND METHOD FOR TRANSFERRING DATA ACQUIRED FROM MEMORY

BACKGROUND OF THE INVENTION

1. Field of the Invention

The present invention relates to a communication data transfer device, and more particularly to a data transfer device acquiring data stored in memory and executing an alignment process for packet communications.

2. Description of Related Art

In association with progress and wide use of network technology as represented by the Internet, many computers are connected to networks for data communication with other computers. Typically, a computer is connected to a LAN (Local Area Network), as represented by Ethernet, for data communications with other computers within the LAN, and connected to external networks via the LAN.

Data is transferred via a network controller within the computer. The network controller executes the necessary processing for data acquired from the main memory, and outputs the created packet data to the LAN. Furthermore, the necessary processing for the packet data acquired from the LAN is executed, and that data is stored in the main memory. FIG. 4 is a block diagram illustrating data processing for data transfer using a related technique.

FIG. 4 shows the aligner 310 which consists a part of the network controller, and the main memory 350 which stores data. The aligner 310 and main memory 350 send and receive data via the data bus 360. The aligner 310 incorporates alignment logic 311 to align acquired data in a sequence for packet communications on the network. Furthermore, the aligner 310 also incorporates the FIFO 312 temporarily store data from the alignment logic 311 and output the stored data in the order of storage, and the sequencer 313 controlling reading of data from the main memory 350 and output of data from the FIFO 312.

In FIG. 4, aligned data is stored in the FIFO 312. Each square in the FIFO 312 represents one byte of data. Furthermore, the hatched squares represent communication data valid for transfer, and the white squares represent communication data invalid for transfer. The alignment logic 311 aligns valid data into a contiguous sequence of data as shown in FIG. 4 from data comprising both invalid and valid data.

Data transfer processing in the system shown in FIG. 4, in particular, output processing of data stored in the main memory 350, is described below. Firstly, the sequencer 313 issues a request to read data from the main memory 350 (MReq) ([1]). In response to the request, the data RDATA is read from the main memory 350, and provided to the alignment logic 311 of the aligner 310 ([2]). The alignment logic 311 aligns the acquired data, and outputs ALRDATA to FIFO 312 ([3]).

After transfer of data from the main memory 350 to the aligner 310 is completed, MAck indicating the completion is sent to the sequencer 313 ([4]). In response to MAck, the sequencer 313 outputs the Ctl signal controlling the FIFO 312 so that the data in the FIFO 312 is output in the next data processing block ([5]). This processing is repeated until no data remains to transfer. Additionally, a storage buffer with a plurality of data registers which processes a store request from the CPU to the memory is disclosed in Japanese Patent Application Laid-open No. 61-118853.

In the technique described with reference to FIG. 4, data input from the main memory main memory 350 to the alignment logic 311 requires waiting for completion of output of the prescribed number of bytes from the FIFO 312. For example, when 64 bytes of data are read from the main memory 350, it is needed that the full FIFO 312 outputs 64 bytes of data to prepare free space sufficient for storage of 64 bytes of data, and data is then transferred from the main memory 350.

It has now been discovered that, however, since other circuit configurations also use data bus 360, it may not be possible to start data transfer from the main memory 350 at the timing when free space becomes available in the FIFO 312. If data cannot be read from the main memory 350 at the desired timing, dead time is introduced to delay data transfer.

In particular, the speed of data transfer in networks is increasing in association with recent progress in semiconductor technology and data processing technology. For example, Ethernet data transfer speed has increased from 10 Mbps, to 100 Mbps, and subsequently to 1 Gbps. Thus, latency from the main memory 350 to the aligner 310 can form a bottleneck, and cause an inability to accommodate external data transfer speeds.

Additionally, it is necessary to input data read from the main memory 350 to the FIFO in the sequence in which it was read. Thus, read commands must be issued and completed individually and independently, and the efficiency of the bus use cannot be improved by interleaving the commands.

SUMMARY OF THE INVENTION

According to an aspect of the invention, there is provided a data transfer device transferring data acquired from a memory comprising a plurality of buffer memories temporarily storing data from a memory and being capable of receiving and providing data independently of each other, an aligner aligning input data in a sequence corresponding to a packet communication, and a selector selecting a buffer memory from the plurality of buffer memories to output data from the selected buffer memory toward the aligner.

According to another aspect of the invention, there is provided a communication data processing device comprising, a memory storing data, a data bus transmitting data read from the memory, a plurality of buffer memories temporarily storing data from the memory via the data bus and being capable of receiving and providing data independently of each other, a bus arbiter arbitrating use of the data bus to control data read from the memory to the plurality of buffer memories, an aligner aligning input data in a sequence corresponding to a packet communication, and a selector selecting a buffer memory from the plurality of buffer memories to output data from the selected buffer memory toward the aligner.

According to still another aspect of the invention, there is provided a data transfer method for transferring data acquired from a memory to a packet communication network comprising, storing data acquired from a memory in a plurality of buffer memories being capable of receiving and providing data independently of each other, selecting a buffer memory from the plurality of buffer memories, and aligning input data from the selected buffer memory in a sequence corresponding to a packet communication.

With the plurality of buffer memories, alignment processing for data acquired from the memory, and transfer of aligned data, can be executed efficiently.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

First Embodiment

Figure 1:
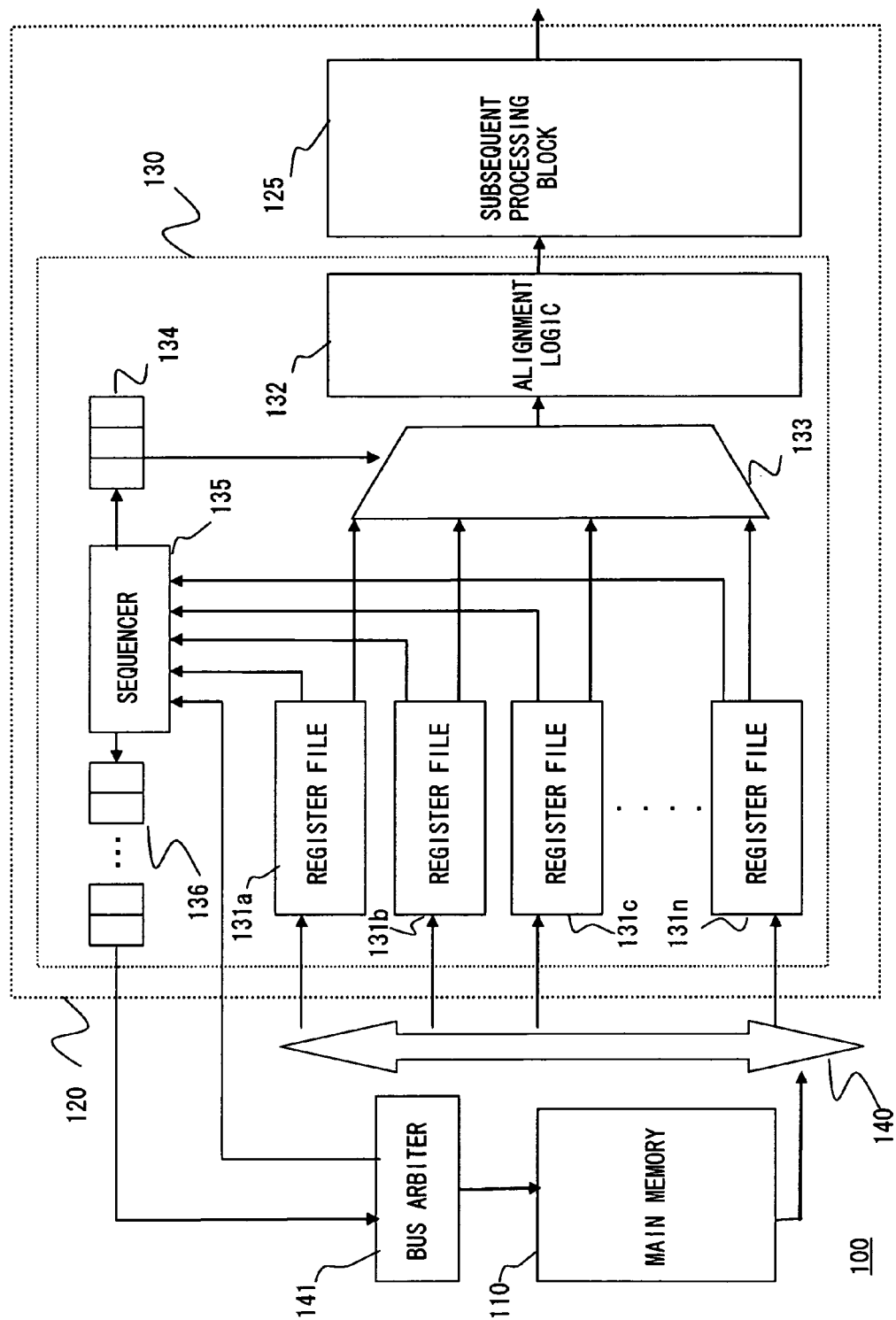
FIG. 1 is a block diagram showing the configuration in outline of the communication data processing system in the first embodiment.

FIG. 1 is a schematic block diagram showing the configuration of the communication data processing system 100 according to the present embodiment. As shown in FIG. 1, the communication data processing system 100 comprises a main memory 110 storing communication data, and a data transfer section 120 transferring data acquired from the main memory 110. A typical example of the data transfer section 120 is a network controller connected to a LAN and the like. The data transfer section 120 has an aligner 130 to align data acquired from the main memory 110 to form the packet data to be sent. The main memory 110 and the aligner 130 execute data communications via the data bus 140.

The main memory 110 stores communication data input from an external source, and communication data to output to an external destination. The main memory 110 also stores the necessary data in response to requests from other circuit configurations (not shown in the figure). While communication packet data is in the form of a byte stream, data is read from the main memory 110 in 32-bit width or 64-bit width, for example.

The aligner 130 has a plurality of register files 131a through 131n (hereafter referred to collectively as 'register file 131') which are examples of buffer memories temporarily storing data acquired from the main memory 110. The register files 131 can receive and provide data independently of each other. Each register file 131 operates individually, and can write and read data independently of other register files. While data is being written to a register file 131, the aligner 130 read data from another register file 131.

The aligner 130 also has alignment logic 132 to align data from the register files 131 in the prescribed sequence. The alignment logic 132 aligns, for example, acquired data in sequence for Ethernet packet communications. Data acquired from the main memory 110, which is 32-bit width or 64-bit width for example, includes both valid data and invalid data as communication data. The alignment logic 132 reorders this data and arranges it in the prescribed byte width for the communication protocol, allowing efficient creation of packet data in subsequent processing. Output data from the alignment logic 132 is transferred to block 125 in which the next data processing within the data transfer section 120 is executed.

Data from the register files 131 is input to the alignment logic 132 via the selector 133. The selector 133 selectively outputs data from a plurality of register files 131 to the alignment logic 132. Thus, data stored in a plurality of register files 131 can be transferred to the alignment logic 132 in the required sequence. The selector 133 selects one of a plurality of register files 131 according to a request queued in the alignment request queue 134. In FIG. 1, three requests are placed in the alignment request queue 134, however the number of requests is not limited to three.

The sequencer 135 executes control processing in the communication data processing system 100. In particular, it controls reading data from the main memory 110 to the register files 131, and controls output of data from the register files 131 to the alignment logic 132. Control of input of data from the main memory 110 to the register files 131 is executed by placing a request in the bus request queue 136. Furthermore, by placing a request in the alignment request queue 134, the sequencer 135 controls selection of data read from the register files 131 and provided to the alignment logic 132. The number of requests placed in the bus request queue 136 is selected through design to allow efficient processing.

As mentioned before, the sequencer 135 executes the control processing in response to control signals from other elements of the configuration. In practice, the sequencer 135 controls transfer of data within the communication data processing system 100 in response to, for example, the request reception completion signal from the bus arbiter 141, and the ready signal from the register files 131.

The data bus 140 is shared in common by a plurality of circuit configurations, including circuit configurations not shown in the figures. Thus, data communications via the data bus 140 is controlled by the bus arbiter 141. The bus arbiter 141 arbitrates use of the data bus 140.

In FIG. 1, the bus arbiter 141 controls data transmission on the data bus 140 in response to a request queued in the bus request queue 136. The bus system of the present embodiment can issue differing data read requests, and execute and complete readings of data from the main memory 110 corresponding to these requests in a order different from the request issue. In other words, the bus system can determine the issue sequence of data read requests and the execution sequence of actual reading independently.

For example, when the first read command is issued for the bus arbiter 141, followed by issue of the second read command, reading of data corresponding to the second read command can be completed first, followed by completion of reading of data corresponding to the first read command (as mentioned before, this out of sequence processing is generally referred to as a 'split transaction'). Thus, the efficiency of use of the data bus 140, and the overall efficiency of data transfer, are improved.

Figure 2:
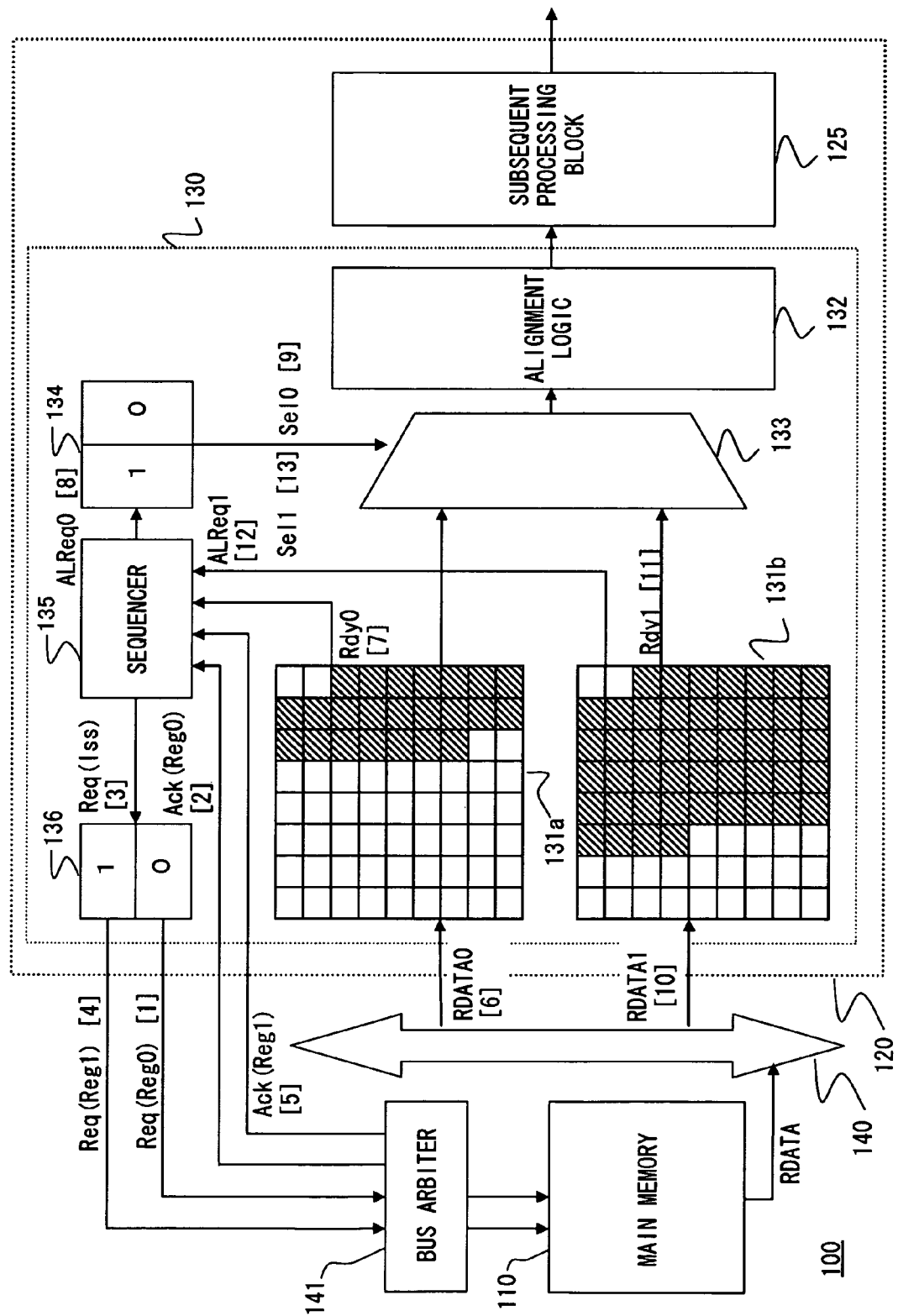
FIG. 2 is a diagram describing transfer processing of communication data in the communication data processing system in the first embodiment.

Processing in the communication data processing system 100 of the present embodiment is described below in reference to FIG. 2. FIG. 2 shows the sequence of control data and read data from the main memory 110 in the communication data processing system 100. In the present example, the communication data processing system 100 has two register files 131a and 131b. Each register file 131a and 131b can store 64 bytes of data. One square in each register file 131a and 131b represents one byte of data.

The request Req (Reg0) requesting reading of data from the main memory 110 to the register file 131a (Reg0), and the request Req (Reg1) requesting reading of data from the main memory 110 to the register file 131b (Reg1), are each queued in the bus request queue 136. The issuing order is Req (Reg0) followed by Req (Reg1).

The bus request queue 136 issues the Req (Reg0), which is a data read request to Reg0, to the bus arbiter 141 ([1]) in response to a request from the sequencer 135. In response to the Req (Reg0), the bus arbiter 141 returns Ack (Reg0), indicating that reception of the request has been completed, to the sequencer 135 ([2]) In response to Ack (Reg0) from the bus arbiter 141, the sequencer 135 requests the bus request queue 136 to issue the Req (Reg1) which is a request for reading of data to the register file 131b (Reg1) ([3]).

The bus request queue 136 issues Req (Reg1) to the bus arbiter 141 ([4]) in response to a request from the sequencer 135. The bus arbiter 141 returns Ack (Reg1), indicating that reception of the request has been completed, to the sequencer 135 in relation to Req (Reg1) ([5]). Here, Req (Reg1) is issued before the data response is returned to the register file 131a (Reg0) for Req (Reg0) Read data has not therefore been written to the register file 131a (Reg0) at this timing.

Then, in response to Req (Reg0) from the bus arbiter 141 to the main memory 110, read data corresponding to Req (Reg0) is written to the register file 131a (Reg0) from the main memory 110 via the data bus 140 ([6]). FIG. 2 shows the state in which data has been written to the register file 131a (Reg0). In the present example, data of 64 bits width can be read from the main memory 110, and the register file 131a stores 64 bits of data. In the register file 131a, data valid as transferred communication data is represented by hatched squares, and invalid data is represented by white squares.

In response to writing data, the register file 131a sends a ready signal (Rdy0) to the sequencer 135 indicating that preparations for data transfer (output) are completed ([7]). In response to Rdy0, the sequencer 135 places the alignment request ALReq0 in the alignment request queue 134 ([8]). ALReq0 is a request to execute alignment processing of data stored in the register file 131a.

The control signal (Sel0) corresponding to ALReq0 is output from the alignment request queue 134 to the selector 133 ([9]). The selector 133 selects the register file 131a in accordance with the control signal, and transfers the data read from the register file 131a to the alignment logic 132. The alignment logic 132 executes alignment processing to align the sequence of the input data.

Data can be transferred from the main memory 110 to the register file 131b while data is being transferred from the register file 131a to the alignment logic 132, or while the alignment logic 132 is executing alignment processing. In response to Req (Reg1) sent from the bus arbiter 141 to the main memory 110, read data corresponding to Req (Reg0) is written to the register file 131b (Reg1) from the main memory 110 via the data bus 140 ([10]). FIG. 2 shows the state in which 64-byte data is stored in the register file 131b, similar to the register file 131a.

The register file 131b outputs Rdy1 to the sequencer 135 in response to completion of data storage ([11]). The sequencer 135 places ALReq1 in the alignment request queue 134 in response to Rdy1 ([12]). The sequencer 135 waits for completion of alignment processing of data from the register file 131a if the alignment processing is not yet completed.

When the processing is completed, or when the processing has already been completed, the sequencer 135 requests output of the control signal corresponding to ALReq1 to the alignment request queue 134. In response to the request, the alignment request queue 134 outputs a control signal (Sel1) to the selector 133 instructing selection of the register file 131b ([13]). The selector 133 selectively outputs data read from the register file 131b to the alignment logic 132. Alignment logic 132 processing is similar to that described above.

As described above, the data transfer section 120 of the present embodiment has a plurality of register files 131, wherein data read from the main memory is being stored in one register file during data reading from another register file and its alignment processing. Thus, data can be efficiently transferred from the main memory to the alignment logic, and the data transfer section 120 can accommodate high-speed communications.

Although two register files are shown in FIG. 2, as shown in FIG. 1, the data transfer section 120 can have three or more register files. The greater number of register files, the more efficient data transfer from the main memory 110 to the alignment logic 132 is achieved. This is similar in the following embodiment.

Second Embodiment

Figure 3:
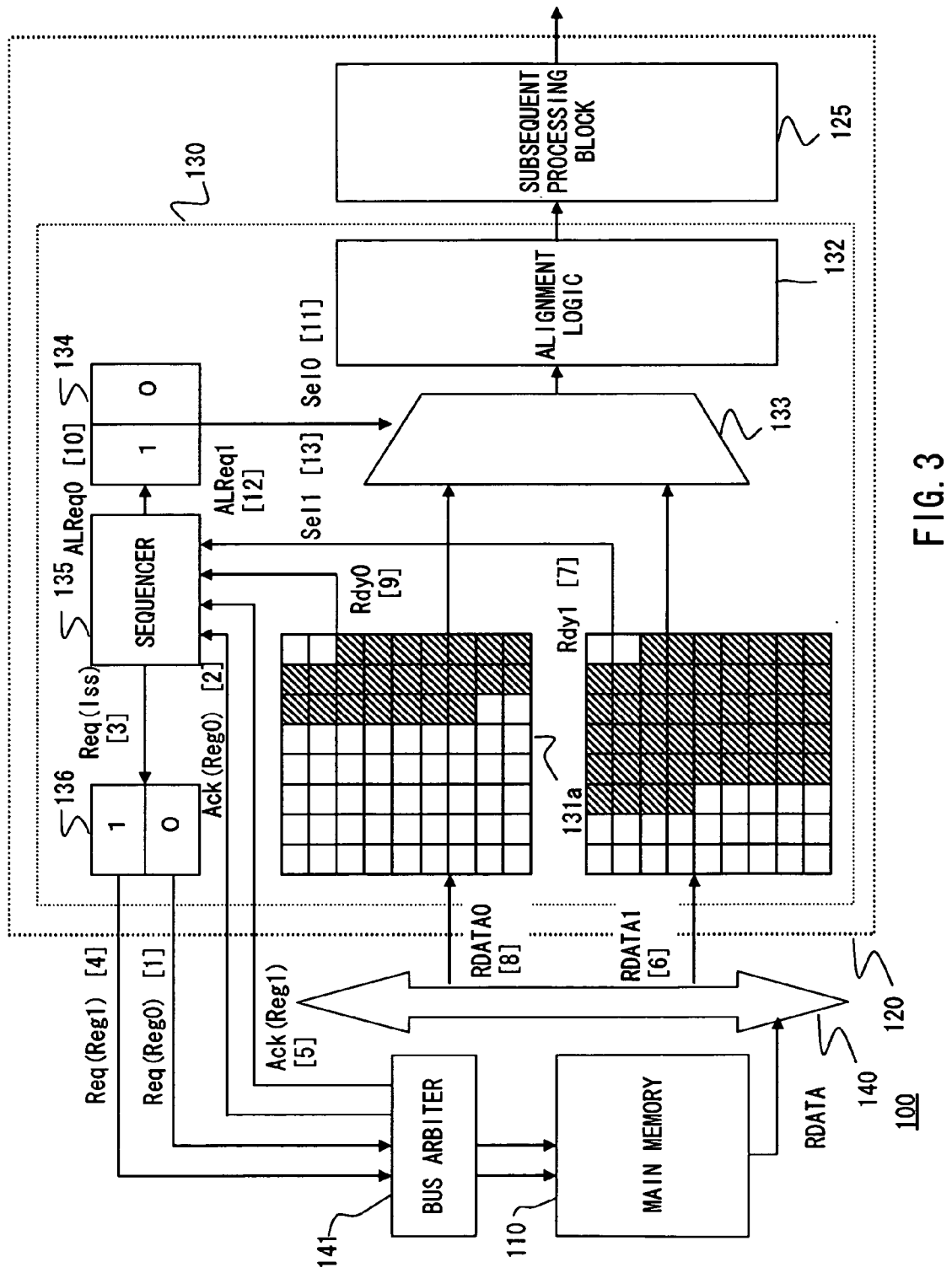
FIG. 3 is a diagram describing transfer processing of communication data in the communication data processing system in the second embodiment.
Figure 4:
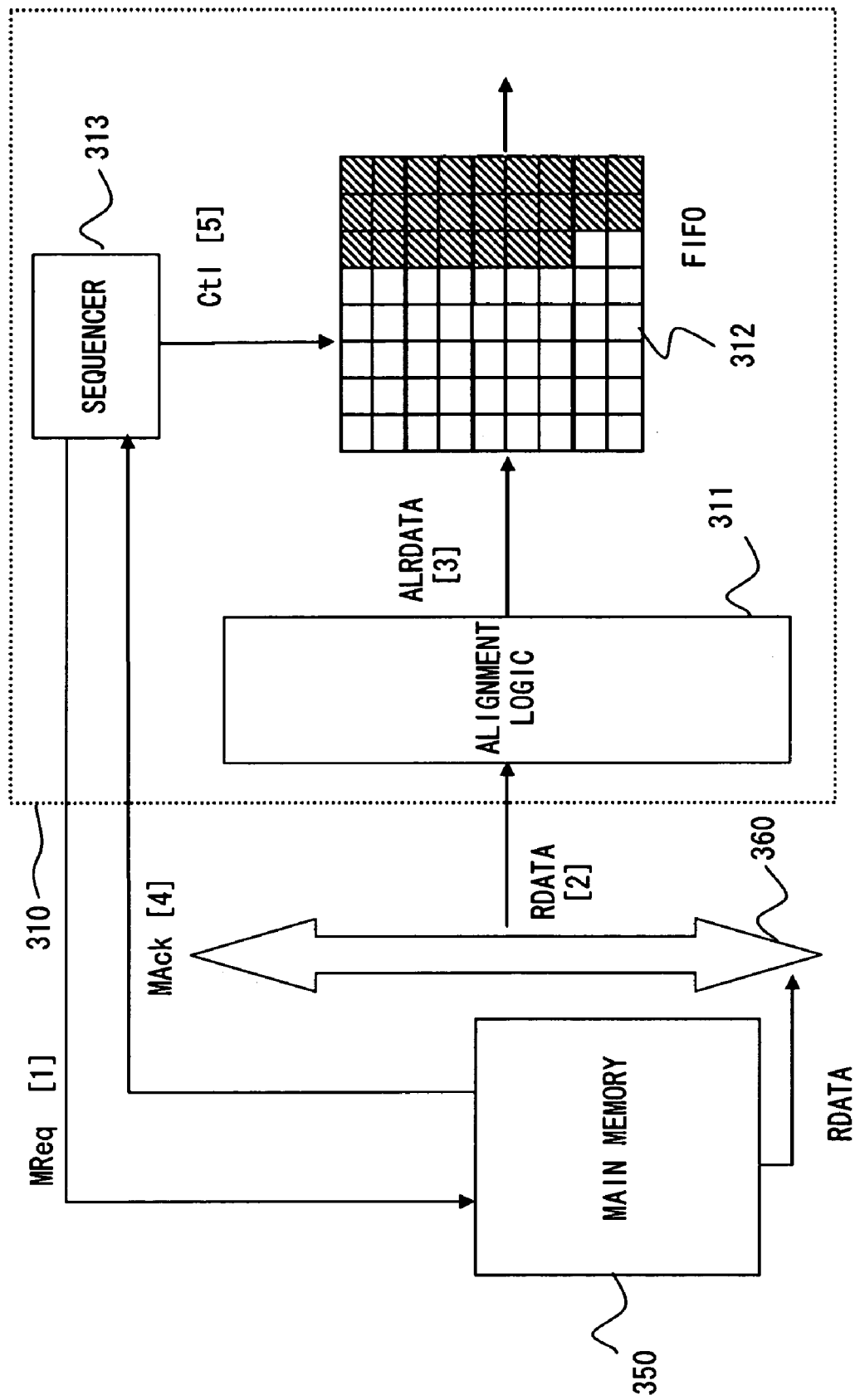
FIG. 4 is a diagram describing transfer processing of communication data in the communication data processing system with conventional technology.

Other features of the communication data processing system 100 are described in reference to FIG. 3. As described above, the bus system of the present embodiment accommodates split transactions. As mentioned before, data is read from the main memory 110 in accordance with the sequence of the request, however in the present embodiment, data is read from the main memory 110 in a sequence differing from the request. The process until the bus arbiter 141 returns Ack (Reg1) to the alignment logic 132 ([5]) is similar to the process described in reference to FIG. 2 and the detailed description is therefore omitted.

The main memory 110 transfers read data corresponding to Req (Reg1) to the register file 131b before transferring read data corresponding to Req (Reg0) ([6]). Responsive to completing storage of read data from the main memory 110, the register file 131b sends Rdy1 to the sequencer 135 ([7]). Alignment processing by the alignment logic 132 is required to follow the sequence in which the Req was issued to the main memory 110. Thus, the sequencer 135 waits for transfer of data corresponding to Req (Reg0) without placing ALReq1 in the alignment request queue 134.

When the register file 131a stores data transferred from the main memory 110 ([8]), the register file 131a sends Rdy0 to the sequencer 135 ([9]). In response to acquisition of Rdy0, the sequencer 135 places the alignment request ALReq0 in the alignment request queue 134 ([10]). The control signal Sel0 corresponding to ALReq0 is [then] output to the selector 133 from the alignment request queue 134 ([11]). The selector 133 selects the register file 131a in accordance with the control signal, and transfers data read from the register file 131a to the alignment logic 132. The alignment logic 132 executes alignment processing in which the sequence of the input data is rearranged.

After queuing ALReq0, the sequencer 135 places ALReq1 in the alignment request queue 134 ([12]). When alignment processing of the data from the register file 131a is complete, the alignment request queue 134 outputs the control signal Sel1 in related with ALReq1 to the selector 133 in response to the request from the sequencer 135 ([13]). The selector 133 selects and outputs data from the register file 131b to the alignment logic 132 in response to the control signal. The alignment logic 132 executes alignment processing to align the sequence of the input data.

In the present embodiment, the communication data processing system 100 reads data from the main memory 110 in a sequence differing from the sequence of the requests queued in the bus request queue 136 with the use of split transactions according to the usage status of the data bus 140. Thus, a combination of a data transfer section 120 having a plurality of register files, and a bus system conducting split transaction processing make it possible to execute overall processing in the communication data processing system 100 efficiently.

It is apparent that the present invention is not limited to the above embodiment that may be modified and changed without departing from the scope and spirit of the invention.

What is claimed is:

1. A communication data processing device comprising:
a memory storing data;
a plurality of buffer memories coupled to the memory via a data bus, each said buffer memory capable of receiving data and providing data independently from the other buffer memories;
a selector coupled to the plurality of buffer memories;
a data read request queue storing read requests for requesting data to be read from the memory and written into one of the plurality of buffer memories;
a bus arbiter coupled to the memory and the data read request queue, the bus arbiter arbitrating a data transfer via the data bus from the memory to one of the plurality of buffer memories in response to the read request;
a selection control data queue coupled to the selector, the selection control data queue storing selection control data indicating which one of the plurality of buffer memories is selected by the selector;
an alignment logic coupled to the selector, the alignment logic aligning data output from the selector into a sequence corresponding to a packet communication; and
a controlling section coupled to the plurality of buffer memories and the selection control data queue,
wherein each of the plurality of buffer memories sends a ready signal to the controlling section in response to a completion of data transfer from the memory into the buffer memory, thereby indicating that the buffer memory is ready to transfer data to the alignment logic,
wherein the controlling section places the selection control data in the selection control data queue to indicate a buffer memory which sends the ready signal.

2. The communication data processing device of claim 1, wherein the bus arbiter controls independently an issue sequence of data read requests for requesting data read from the memory to the plurality of buffer memories and a sequence of transferring data from the memory to the plurality of buffer memories.

3. The communication data processing device of claim 1, wherein
the controlling section further couples to the data read request queue, the controlling section issuing and placing the data read requests in the data read request queue and placing the selection data in the selection control data queue in the same sequence as the data read requests issue.

4. A data transfer method for transferring data acquired from a memory to a packet communication network, said method comprising:
storing data to be aligned in a memory;
storing read requests in a data read request queue for requesting data to be read from the memory and to be written into one of a plurality of buffer memories coupled to the memory via a data bus;
arbitrating, using a bus arbiter coupled to the memory and the data read request queue, a data transfer via the data bus from the memory to one of the plurality of buffer memories in response to the read request;
storing selection control data in a selection control data queue coupled to a selector, the selection control data indicating which one of the plurality of buffer memories is to be selected by the selector;
storing data acquired from the memory in a selected one of the plurality of buffer memories in accordance with a read signal, each said buffer memory capable of receiving and providing data independently of each other buffer memory; and
aligning input data from the selected buffer memory into a sequence corresponding to a packet communication,
wherein each of the plurality of buffer memories sends a ready signal to a controlling section in response to a completion of data transfer, thereby indicating that the buffer memory is ready to transfer data to an alignment logic, the controlling section placing selection control data in the selection control data queue to indicate a buffer memory which sends the ready signal.

5. The data transfer method of claim 4, wherein a buffer memory is selected in such a manner that an issue sequence of data read requests for data read from the memory is the same as a sequence in which data corresponding to the data read requests are read from the plurality of buffer memories for the aligning.

6. The data transfer method of claim 4, wherein an issue sequence of data read requests for requesting data read from the memory to the plurality of buffer memories and a sequence of transferring data from the memory to one of the plurality of buffer memories are controlled independently.

7. The communication data processing device according to claim 1, wherein the plurality of buffer memories includes first and second buffer memories, the data transfer device issuing data read requests from the first buffer memory to the aligner and data read requests from the memory to the second buffer memory in parallel.

8. The communication data processing device according to claim 1, further comprising a sequencer controlling the selector, wherein the sequencer outputs data to the buffer memory corresponding to an order of the data request when an order of outputting the data from the memory is different from an order of issuing the data request to the memory.

9. The data transfer method of claim 4, wherein the plurality of buffer memories includes first and second buffer memories, the data transfer device issuing data read requests from the first buffer memory to the aligner and data read requests from the memory to the second buffer memory in parallel.

10. The data transfer method of claim 4, wherein a sequencer controlling the selecting outputs data to the buffer memory corresponding to an order of the data request when an order of outputting the data from the memory is different from an order of issuing the data request to the memory.

11. The communication data processing device according to claim 3, wherein the controlling section controls placing the data read request in the data read request queue and placing the selection data in the selection control data queue independently.

12. The communication data processing device of claim 1, wherein each of the plurality of buffer memories further sends a ready signal to the controlling section in response to a completion of data transfer from the buffer memory to the selector, thereby indicating the buffer memory as ready to receive new data from the memory.

13. The communication data processing device of claim 12, wherein a first buffer memory receives data from the memory at a same time that a second buffer memory is providing data to the alignment logic via the selector.

* * * * *